United States Patent
Davis et al.

(10) Patent No.: US 12,136,043 B1
(45) Date of Patent: Nov. 5, 2024

(54) TRANSFORMING CONVERSATIONAL TRAINING DATA FOR DIFFERENT MACHINE LEARNING MODELS

(71) Applicant: LikeHuman LLC, Las Cruces, NM (US)

(72) Inventors: Milo Davis, Las Cruces, NM (US); Mark William Davis, Las Cruces, NM (US)

(73) Assignee: LikeHuman LLC, Las Cruces, NM (US)

( * ) Notice: Subject to any disclaimer, the term of this patent is extended or adjusted under 35 U.S.C. 154(b) by 279 days.

(21) Appl. No.: 17/711,804

(22) Filed: Apr. 1, 2022

Related U.S. Application Data

(60) Provisional application No. 63/170,061, filed on Apr. 2, 2021.

(51) Int. Cl.
*G06N 5/022* (2023.01)
*G06F 40/169* (2020.01)
(Continued)

(52) U.S. Cl.
CPC .......... *G06N 5/022* (2013.01); *G06F 40/169* (2020.01); *G06F 40/284* (2020.01); *G06F 40/35* (2020.01); *G06F 40/253* (2020.01)

(58) Field of Classification Search
CPC ...... G06F 3/013; G06F 16/245; G06F 16/903; G06F 40/157; G06F 40/169; G06F 40/216; G06F 40/232; G06F 40/253; G06F 40/284; G06F 40/289; G06F 40/30; G06F 40/35; G06F 40/44; G06F 40/45; G06F 40/49;
(Continued)

(56) References Cited

U.S. PATENT DOCUMENTS 8,068,780 B2 * 11/2011 Cohen ............... G09B 7/00
 434/323
8,185,372 B2 * 5/2012 Sumita ............... G06F 40/45
 704/4
(Continued)

OTHER PUBLICATIONS

Martin, Scott, "What is Transfer Learning?" as published on Feb. 7, 2019.
(Continued)

*Primary Examiner* — Gerald Gauthier
(74) *Attorney, Agent, or Firm* — Patterson + Sheridan, LLP

(57) ABSTRACT

A method includes receiving a command to transform a first statement in a first conversational training set into training data for a second training set, where the first conversational training set trains a first machine learning model in a first knowledge area, and where the second conversational training set trains a second machine learning model in a second knowledge area. The method also includes analyzing language of the first statement using a third machine learning model, where the third machine learning model is trained to recognize patterns of language variation between the first and second knowledge areas. The method also includes, responsive to the analyzing, selecting an original segment of the first statement. The method also includes, responsive to the selecting, transforming the first statement into a second statement, for the second conversational training set, that includes a substitute segment that at least partially replaces the original segment.

20 Claims, 5 Drawing Sheets

(51) Int. Cl.
*G06F 40/284* (2020.01)
*G06F 40/35* (2020.01)
*G06F 40/253* (2020.01)

(58) Field of Classification Search
CPC ........ G06F 40/58; G06F 3/04817; G06F 9/54;
G06F 16/2455; G06F 16/3323; G06F
16/90332; G06F 18/2148; G06F 30/15;
G06F 40/51; G06N 3/006; G06N 3/044;
G06N 5/022; G06N 20/00; G06N 3/08;
G06N 3/084; G06V 20/10; G10L 15/005;
G10L 15/1815; G10L 15/26; G10L 13/08;
G10L 15/1822; G10L 15/22; H04M
3/4936; G06Q 30/0275; G09B 5/02;
G09B 7/00; G09B 7/02; G09B 9/02;
G09B 19/0076; H04L 67/535
See application file for complete search history.

(56) References Cited

U.S. PATENT DOCUMENTS

| | | | | |
|---|---|---|---|---|
| 9,002,698 | B2 * | 4/2015 | Sumita | G10L 15/005 |
| | | | | 704/4 |
| 9,031,828 | B2 * | 5/2015 | Leydon | G06F 40/232 |
| | | | | 704/3 |
| 9,530,326 | B1 * | 12/2016 | Ramloll | G09B 5/02 |
| 10,831,802 | B2 * | 11/2020 | Blandin | G06N 20/00 |
| 10,909,422 | B1 * | 2/2021 | Gaeta | H04L 67/535 |
| 11,290,564 | B1 * | 3/2022 | Liu | G06N 3/08 |
| 11,380,304 | B1 * | 7/2022 | Ponnusamy | G10L 15/1822 |
| 11,437,026 | B1 * | 9/2022 | Roshan Ghias | G10L 15/22 |
| 11,645,479 | B1 * | 5/2023 | Coursey | G06F 40/58 |
| | | | | 704/9 |
| 11,663,411 | B2 * | 5/2023 | Baum | G06F 40/284 |
| | | | | 704/9 |
| 11,687,729 | B2 * | 6/2023 | Venkataraman | G06F 16/2455 |
| | | | | 704/9 |
| 11,694,038 | B2 * | 7/2023 | Le | G06N 3/044 |
| | | | | 704/9 |
| 11,704,486 | B2 * | 7/2023 | Wu | G06N 3/045 |
| | | | | 704/9 |
| 11,704,900 | B2 * | 7/2023 | Koukoumidis | G06F 3/013 |
| | | | | 704/9 |
| 11,741,306 | B2 * | 8/2023 | Galley | G06N 3/044 |
| | | | | 704/9 |
| 11,741,317 | B2 * | 8/2023 | Trehan | G10L 15/26 |
| | | | | 704/9 |
| 11,769,011 | B2 * | 9/2023 | Yang | G06N 20/00 |
| | | | | 704/9 |
| 2008/0058745 | A1 * | 3/2008 | Long | G09B 19/0076 |
| | | | | 604/361 |
| 2008/0162111 | A1 * | 7/2008 | Bangalore | G06F 40/44 |
| | | | | 704/9 |
| 2012/0330647 | A1 * | 12/2012 | Burges | G06F 40/44 |
| | | | | 704/E11.001 |
| 2014/0316764 | A1 * | 10/2014 | Ayan | H04M 3/4936 |
| | | | | 704/9 |
| 2015/0066479 | A1 * | 3/2015 | Pasupalak | G06F 16/90332 |
| | | | | 704/9 |
| 2015/0088489 | A1 * | 3/2015 | Abbas | G06F 40/35 |
| | | | | 704/9 |
| 2016/0078020 | A1 * | 3/2016 | Sumita | G06F 40/157 |
| | | | | 704/9 |
| 2016/0292351 | A1 * | 10/2016 | Jacques | G06F 30/15 |
| 2016/0293037 | A1 * | 10/2016 | Jacques | G09B 9/02 |
| 2016/0329047 | A1 * | 11/2016 | Tur | G10L 13/08 |
| 2019/0340527 | A1 * | 11/2019 | Liden | G06F 3/04817 |
| 2020/0090641 | A1 * | 3/2020 | Kim | G06N 3/006 |
| 2021/0035151 | A1 * | 2/2021 | Yang | G06Q 30/0275 |
| 2021/0081475 | A1 * | 3/2021 | Pham | G06N 3/084 |
| 2021/0081799 | A1 * | 3/2021 | Johnson | G06F 40/30 |
| 2021/0224486 | A1 * | 7/2021 | Stabler | G06F 18/2148 |
| 2021/0360106 | A1 * | 11/2021 | Matula | G06F 40/51 |
| 2022/0171923 | A1 * | 6/2022 | Wu | G06F 40/284 |
| 2022/0270505 | A1 * | 8/2022 | Carmichael | G09B 7/02 |
| 2023/0099773 | A1 * | 3/2023 | Liu | G10L 15/1815 |
| | | | | 704/9 |
| 2023/0118962 | A1 * | 4/2023 | Liu | G06V 20/10 |
| | | | | 704/9 |
| 2023/0274095 | A1 * | 8/2023 | Kelkar | G06F 40/49 |
| | | | | 704/9 |

OTHER PUBLICATIONS

NVIDIA Corporation, "Overview—Transfer Learning Toolkit" article as updated Nov. 18, 2020 per website.

* cited by examiner

TRANSFORMING CONVERSATIONAL TRAINING DATA FOR DIFFERENT MACHINE LEARNING MODELS

CROSS-REFERENCE TO RELATED APPLICATIONS

This patent application claims priority to U.S. Provisional Application No. 63/170,061 filed on Apr. 2, 2021. U.S. Provisional Application No. 63/170,061 is hereby incorporated by reference.

BACKGROUND

Technical Field

The present disclosure relates generally to natural language processing and more particularly, but not by way of limitation, to systems and methods of maintaining dialogue consistency in natural language models.

History of Related Art

Natural language systems currently use a range of methods to process requests from human interlocutors. However, responses to such requests are often unproductive and not relevant to the conversation.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method of transforming conversational training data. The method is performed by a computer system. The method includes receiving a command to transform a first statement in a first conversational training set into training data for a second training set, where the first conversational training set trains a first machine learning model in a first knowledge area, and where the second conversational training set trains a second machine learning model in a second knowledge area. The method also includes analyzing language of the first statement using a third machine learning model, where the third machine learning model is trained to recognize patterns of language variation between the first and second knowledge areas. The method also includes, responsive to the analyzing, selecting an original segment of the first statement as a candidate for substitution. The method also includes, responsive to the selecting, transforming the first statement into a second statement for the second conversational training set. The second statement includes a substitute segment that at least partially replaces the original segment. Other embodiments of this aspect include corresponding computer systems, apparatus, and computer programs recorded on one or more computer storage devices, each configured to perform the actions of the methods.

In an embodiment, another general aspect includes a method of transforming conversational training data. The method includes receiving a command to transform a first conversational training set into a second conversational training set, where the first conversational training set trains a first machine learning model in a first knowledge area, and where the second conversational training set trains a second machine learning model in a second knowledge area. The method also includes, for each statement of a plurality of statements in the first conversational training set: analyzing language of the statement using a third machine learning model, where the third machine learning model is trained to recognize patterns of language variation between the first and second knowledge areas; responsive to the analyzing, selecting an original segment of the statement as a candidate for substitution; and responsive to the selecting, transforming the statement into a second statement for the second conversational training set, where the second statement includes a substitute segment that at least partially replaces the original segment. The method also includes outputting the second conversational training set. Other embodiments of this aspect include corresponding computer systems, apparatus, and computer programs recorded on one or more computer storage devices, each configured to perform the actions of the methods.

In an embodiment, another general aspect includes a computer system having a processor and memory. The processor and the memory in combination are operable to implement a method. The method includes receiving a command to transform a first statement in a first conversational training set into training data for a second training set, where the first conversational training set trains a first machine learning model in a first knowledge area, and where the second conversational training set trains a second machine learning model in a second knowledge area. The method also includes analyzing language of the first statement using a third machine learning model, where the third machine learning model is trained to recognize patterns of language variation between the first and second knowledge areas. The method also includes, responsive to the analyzing, selecting an original segment of the first statement as a candidate for substitution. The method also includes, responsive to the selecting, transforming the first statement into a second statement for the second conversational training set. The second statement includes a substitute segment that at least partially replaces the original segment.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
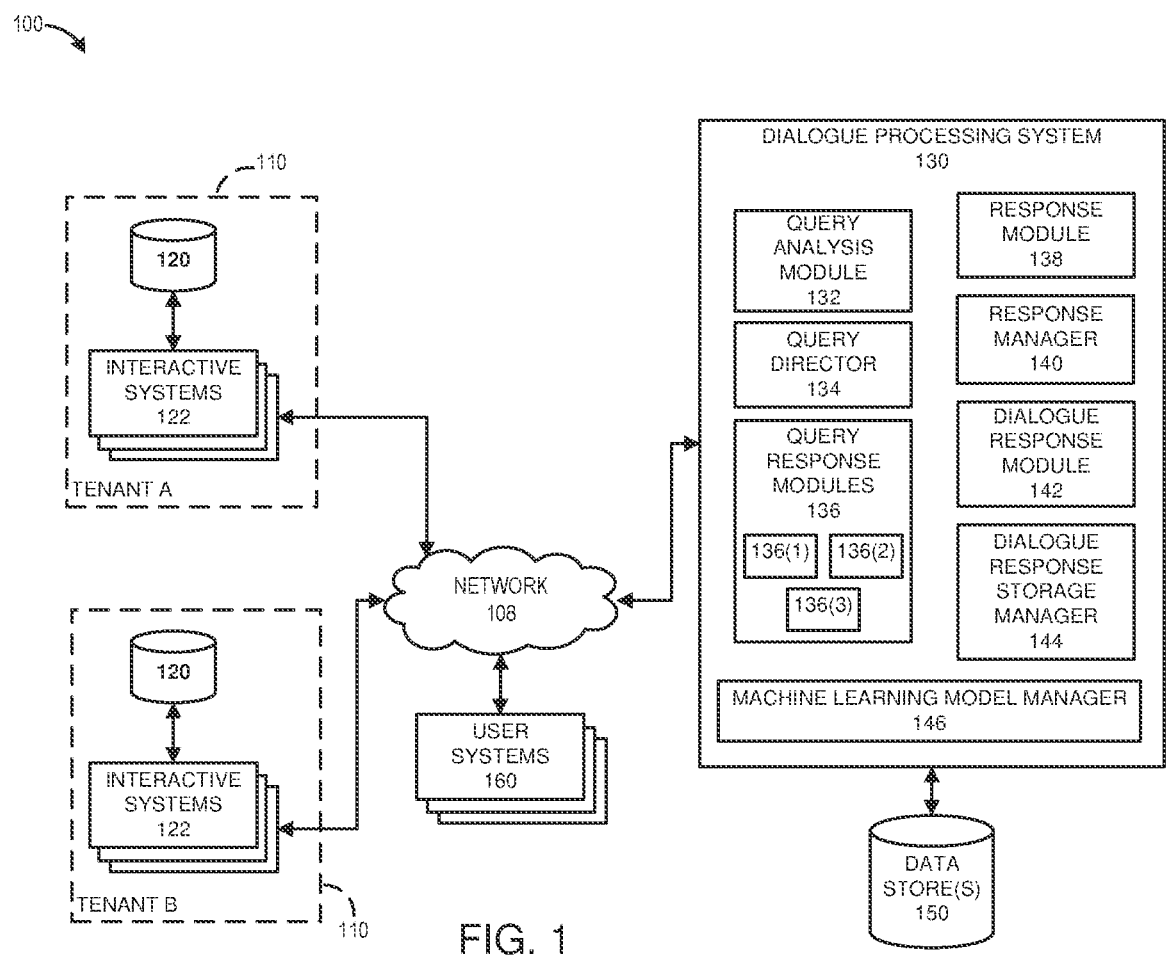
FIG. 1 illustrates an example of a system for implementing a dialogue processing system.

Current natural language systems use a range of methods to process requests from human interlocutors, including deep learning neural networks, generative language models, knowledge representations, parsers, language generation systems, and other approaches. In general, machine learning (ML) systems require training data derived from conversational samples and written sources. Many approaches for acquiring or creating training data are based on sampling data from fielded systems like smart phones and hand annotating them with expected outcomes. Other methods use massive crawls of web content. These methods, however, are filled with duplicates and often have data that is unrelated to the goals of the natural language system.

The present disclosure describes examples of systems and methods for transforming training data for natural language models. In various embodiments, a natural language dialogue can be viewed as a progression of dialogue events, where each dialogue event is a discrete communication from a participant in the dialogue. Certain events may be referred to as queries or responses. In general, a query represents a dialogue event that is processed for possible generation of a response thereto. In similar fashion, in general, a response is a dialogue event that is responsive to a query.

In various cases, historical natural language dialogues can be used to train ML models such as, for example, ML-based natural language models that produce automated responses as part of an ongoing natural language dialogue. Natural language dialogues that are used to train ML models may be referred to herein as a conversational training set or conversational training data. Analyzable portions of a conversational training set or conversational training data may be referred to herein as a statement. A statement can be, for example, a dialogue event (e.g., query or response), a paragraph, a sentence, a phrase, and/or the like. In various embodiments, conversational training data for one ML-based natural language model can be transformed on a statement-by-statement basis for use with a different ML-based natural language model. Examples will be described below relative to the Drawings.

In one embodiment, a training sample for natural dialog systems is created by taking existing dialog samples and exchanging terms and concepts that are in an ontology, dictionary, gazetteer, onomasticon, or other knowledge representations. These terms may be phrases, proper nouns, verbs, or other linguistic groupings of tokens. The system performs an evaluation of the new dialog samples using a statistical analysis of the likelihood of correspondence between the existing dialog terms and the substitute terms. In various embodiments, this method allows for generation of training samples related to a different area of knowledge. In another embodiment, a dictionary of synonyms or hypernyms is used to inform the substitutions of terms. In another embodiment, an ontology, knowledge base, or dictionary is created with a ML model that is trained to identify unique or identifying terms of a pre-existing training sample. In another embodiment, a specialized training set for a specific corpus is simplified, creating a generalized training set for that category of corpora. This generalized training set can serve as a template for models, and the model can then be specialized through fine-tuning to a more specific variety of corpus.

FIG. 1 illustrates an example of a system 100 for implementing a dialogue processing system 130. In various embodiments, the dialogue processing system 130 automatically provides dialogue consistency in dialogues performed via interactive systems. The system 100 includes the dialogue processing system 130, tenant systems 110, user systems 160 and one or more data stores 150, each of which is operable to communicate over a network 108. The network 108 may be, or include, one or more of a private network, a public network, a local or wide area network, a portion of the Internet, combinations of the same, and/or the like.

In some aspects, the dialogue processing system 130 can centrally manage dialogue processing for its tenants. In particular, in the system 100, the tenant systems 110 can be served by the dialogue processing system 130. In general, the tenant systems 110 can each be considered an abstraction of interactive systems that execute dialogues managed by the dialogue processing system 130, as well as the data sources and users associated with such systems. For example, one of the tenant systems 110 is shown as being owned or operated by "Tenant A" while another system 110 is shown as being owned or operated by a different tenant, "Tenant B." The tenant systems 110 shown can be owned or operated by the same or different entities. For example, Tenants A and B can represent customers (e.g., entities such as companies or individuals) of an operator of the dialogue processing system 130. Although the term "tenant" is used herein to describe the tenant systems 110 or owners/operators thereof, in addition to having its ordinary meaning, the term "tenant" can, but need not, refer to tenancy in a multitenant software architecture.

The tenant systems 110 are each shown to include one or more interactive systems 122 and one or more data sources 120. The interactive systems 122 can include a plurality of different communication systems and channels via which users and computer systems can interact to create and maintain dialogues. In various embodiments, the interactive systems 122 can facilitate, for example, voice communication (e.g., voice dialogues), textual communication (e.g., chat dialogues), combinations of the foregoing and/or the like. The dialogues can represent, for example, two-way or multi-way conversations involving any number of human and/or non-human participants. In certain embodiments, the interactive systems 122 of each of the tenant systems 110 can be participants in the dialogues created and maintained thereby, with the dialogue processing system 130 facilitating such participation with recommended responses as described in greater detail below. In various embodiments, the interactive systems 122 can be, or include, games, user support systems, or any other application or service involving interaction.

In the illustrated embodiment, the dialogue processing system 130 can include a query analysis module 132, a query director 134, query response modules 136, a response module 138, a response manager 140, a dialogue response module 142, a dialogue response storage manager 144, and a ML model manager 146. Each of these components can be implemented with hardware and/or software, including (optionally) virtual machines and containers. In an example, the dialogue processing system 130 can be implemented as a single management server. In another example, the dialogue processing system 130 can be implemented in a plurality of virtual or physical servers, which may or may not be geographically co-located. In some embodiments, the dialogue processing system 130 and/or other aspects of the system 100 may be hosted in a cloud.

In certain embodiments, features of the components of the dialogue processing system 130 and/or the interactive systems 122 of each of the tenant systems 110 can be made accessible over an interface to the user systems 160. The user systems 160 can include any type of computing device, including desktops, laptops, tablets, smartphones, and wearables, to name a few. In this way, the user systems 160 can be operated by users of the interactive systems 122, or by administrators or super users, for example, for administration purposes.

In a typical embodiment, the dialogue processing system 130 can operate independent dialogue processing, in parallel, for each distinct natural language dialogue. In this fashion, queries can each be processed in light of the natural language dialogue to which they relate, with automated responses being produced by the dialogue processing system 130 in a manner consistent with that dialogue. Further, in various embodiments, operation of the dialogue processing system 130 can differ for each of the tenant systems 110 and/or for each of the interactive systems 122 of each of the tenant systems 110. For simplicity of description, operation of the components of the dialogue processing system 130 will be described relative to singular queries.

The query analysis module 132 can receive, from any of the interactive systems 122, queries in a natural language dialogue. Upon receipt of a query, the query analysis module 132 can perform an initial query analysis that can include, for example, tokenizing the query by breaking the query into a series of tokens, and annotating the tokens with various features. These various features may include, for example, case-normalized versions of the tokens, parts-of-speech indicators, grammar identifiers, knowledge representation indicators, other linguistic properties, combinations of the foregoing and/or the like. The knowledge representation indicators, if any, can include references to a given token's meaning in a knowledge representation such as an ontology, onomasticon, and/or gazetteer. The series of tokens from the query can also be annotated by a grammar analysis module that provides a grammatical tree representation. Additional annotations may include weights for various aforementioned linguistic elements. In various embodiments, the query analysis module 132 can submit the query and/or information related to the query, such as the annotated series of tokens, to the query director 134.

In some embodiments, the query analysis module 132 can further weight the tokens with domain-specific weighting. In some domains (e.g., for some types of interactive systems), tokens annotated with an emotional state could be configurably provided a relatively higher weight than other tokens. In another example, words deemed less significant in a given domain could be configurably provided a relatively lower weight than other tokens. In various embodiments, the domain-specific weighting can be guided by one or more trained ML models. The weights can be included, for example, as annotations to the series of tokens.

The query director 134 can include logic for selectively routing a query, or information related to a query, to one or more of the query response modules 136. In typical embodiment, the query director 134 includes, or is configured with, one or more response-routing ML models, where the response-routing ML models are each configured to use the query, or the information related to the query (e.g., annotated tokens as discussed above), to evaluate an appropriateness or suitability of each of the query response modules 136 for use in responding to the query. The response-routing ML models can include, for example, artificial neural networks, deep learning neural networks, support vector machines, K nearest neighbor models, naïve Bayesian models, decision trees and forests, or other methods that involve generating a similarity score to a history of data exposures by the model.

For example, in various embodiments, the query director 134, via its response-routing ML models, can score each of the query response modules 136 based on their individual appropriateness or suitability for producing responses the query. In a typical embodiment, the query director 134, via its response-routing ML models, has been trained to route queries to appropriate response modules, not to generate a response itself. In certain embodiments, each response-routing ML model of the query director 134 has been optimized to detect features that indicate a given query's tokens require a specific kind of a response. In an example, a factual query to an electronic customer service system that requests a customer's current balance may require a factual answer based on accessing customer account records. In another example, a query concerning available products may require a factual answer based on a product database. In yet another example, a query in an immersive entertainment system or video game may require accessing a designed model about an automated character's goals in traveling from one destination to another. As further examples, additional types of response modules may include affect-based or emotion-based responses or legal compliance modules. Other types of response modules are possible given a plurality of system requirements.

In a typical embodiment, the query director 134 selects one or more of the query response modules 136 based, at least in part, on its evaluation via the response-routing ML models, and then routes the query or information related to the query (e.g., an annotated series of tokens as discussed above) to the selected modules. For example, the query director 134 can select, and route to, the response module of the query response modules 136 that has the highest score. In another example, the query director 134 can select, and route to, those response modules of the query response modules 136 having the highest N scores. In still another example, the query director 134 can select, and route to, those response modules of the query response modules 136 having scores of at least a threshold value. Other selection logic will be apparent to one skilled in the art after a detailed review of the present disclosure.

In a typical embodiment, the query response modules 136 are each operable to receive information related to a query (e.g., an annotated series of tokens as discussed above) and to provide a response of a different type, with each response module generally using and being configured with a different trained ML model and/or datastore (e.g., factual datastore). For example, with reference to the different types of queries discussed above relative to the query director 134, each type of query that can be detected may correspond to a different response module of the query response modules 136. For example, various of the query response modules 136 may be suited, for example, to produce responses that are factual, discourse-relevant, or even deceptive.

The query response modules 136 can include, for example, artificial neural networks, deep learning neural networks, support vector machines, K nearest neighbor models, naïve Bayesian models, decision trees and forests, or other methods that involve generating a similarity score to a history of data exposures by the model. The query response modules 136 are shown to include a query response module 136(1), a query response module 136(2), and a query response module 136(3). It should be appreciated that three query response modules are shown among the query response modules 136 only for illustrative purposes. In various implementations, any number of query response modules can be included among the query response modules 136.

In certain embodiments, the query response modules 136 are each configured to retrieve response candidates using the trained model and/or datastore (e.g., factual datastore) for that module. The response candidates can be received by the query director 134 and passed to the response manager 140 for further handling in a manner consistent with a corresponding natural language dialogue. In a typical embodiment, the natural language dialogue is represented in a stored record of dialogue events in the one or more data stores 150, with each query and response, for example, being represented as an event in the dialogue.

In general, the response manager 140, the dialogue response module 142, and the dialogue response storage manager 144 collaborate to produce a response to the query in accordance with the corresponding natural language dialogue. In a typical embodiment, the response manager 140 requests, from the dialogue response module 142, top matching dialogue history candidates from the corresponding natural language dialogue. The top matching dialogue history candidates generally represent those dialogue events in the natural language dialogue that are most similar to the query. In certain embodiments, the dialogue response storage manager 144 maintains the natural language dialogue and serves as a point of access for the same. In these embodiments, the dialogue response storage manager 144 can retrieve the dialogue events of the natural language dialogue via the dialogue response storage manager 144 and then rank the dialogue events based on similarity to the query, with the highest ranked dialogue events being presented, for example, as the top matching dialogue history candidates (e.g., as a top-N list). In some embodiments, the dialogue response module 142 uses a trained ML model to identify recent dialogue events. The response manager 140 can compare the top matching dialogue history candidates to the response candidates produced by the query response modules 136.

The response module 138 can include logic for configurably causing a response to be produced in the natural language dialogue and to be recorded as such. In some embodiments, the response is recorded by the dialogue response storage manager 144 in the natural language dialogue before such response is presented, for example, to a user in a given interactive system of the interactive systems 122. In some cases, the response module 138 can decide to produce no response.

In some embodiments, the response module 138 can further annotate the response with additional tokens. For instance, a response that is determined by a trained model to indicate a response to an angry query, for example, based on threats or other linguistic token sets in the query, can be annotated with a token that indicates anger. Such tokens may be represented by an offset character or characters for lookup purposes and internal processing. For example, "_ANGRY_" may be added to the annotated token set for the response before the response is issued and recorded. In various embodiments, the presence of these additional tokens can change the way future responses in the natural language dialogue or generated. In various cases, many such tokens may be used to annotate such responses. In some embodiments, such tokens are maintained as a separate priority queue and attached to language events. In certain cases, this feature supports easily determining a current perspective of a given query response module. Further, in some embodiments, such tokens representing dialogue state are used to fine-tune ML models used in the dialogue processing system 130.

The ML model manager 146 is operable to transform conversational training data for use with different ML-based natural language models. In various embodiments, the ML model manager 146 is operable to perform one or more specific types of transformations using an assortment of ML models and other logic. For each transformation, the ML model manager 146 transforms a source conversational training set into a new conversational training set. In general, the source conversational training set has been previously used to train a first ML model in a first knowledge area. The new conversational training set, which is output by the ML model manager 146, is usable to train a second ML model in a second knowledge area. In various cases, the first and second knowledge areas refer to different domains of knowledge used by the respective ML-based natural language models.

For example, the first knowledge area may correspond to a first character (e.g., historical or fictional), the source conversational training set may include statements that are attributable to that character, and the first ML model may be a ML-based natural language model that is used by a first one of the query response modules 136. In a typical embodiment, the first ML model has been previously trained by the source conversational training set. According to this example, the second knowledge area may correspond to a second character (e.g., historical or fictional), the new conversational training set may include statements attributable to that second character, and the second ML model may be a ML-based natural language model that is used by a second one of the query response modules 136. In typical embodiment, the second training set is usable to train the second ML model. Continuing this example, a transformation from the first knowledge area to the second knowledge area might involve, for each original statement, identifying instances of language patterns that only apply to the first character and producing new statements that replacing portions having those patterns with language that is relevant to or characteristic of the second character. Language patterns can include, for example, historical, geographical and/or time references, grammatical structures, spellings (e.g., UK English vs. US English), combinations of the foregoing and/or the like.

In another example, the first knowledge area and the second knowledge area can each correspond to different knowledge specializations within a common overall topic. For example, if the common overall topic is flowers, the first knowledge area may correspond to roses and the second knowledge area can correspond to magnolias. In yet another example, the second knowledge area can be a specialization of the first knowledge area. According to this example, if the first knowledge area is flowers, the second knowledge area may be magnolias or daffodils. In still another example, the second knowledge area can be a generalization of the first knowledge area. According to this example, if the first knowledge area is magnolias or daffodils, the second knowledge area may be flowers. Other examples will be apparent to one skilled in the art after a detailed review of the present disclosure. The ML model manager 146 will be described in greater detail relative to FIG. 2.

In general, the one or more data stores 150 can include any information collected, stored or used by the dialogue processing system 130. For example, in various embodiments, the one or more data stores 150 can include conversational training data such as natural language dialogues, ML models, dialogue processing settings (e.g., on a tenant-specific basis), combinations of the same and/or the like. In certain embodiments, data stored in the one or more data stores 150 can take the form of repositories, flat files, databases, etc.

Figure 2:
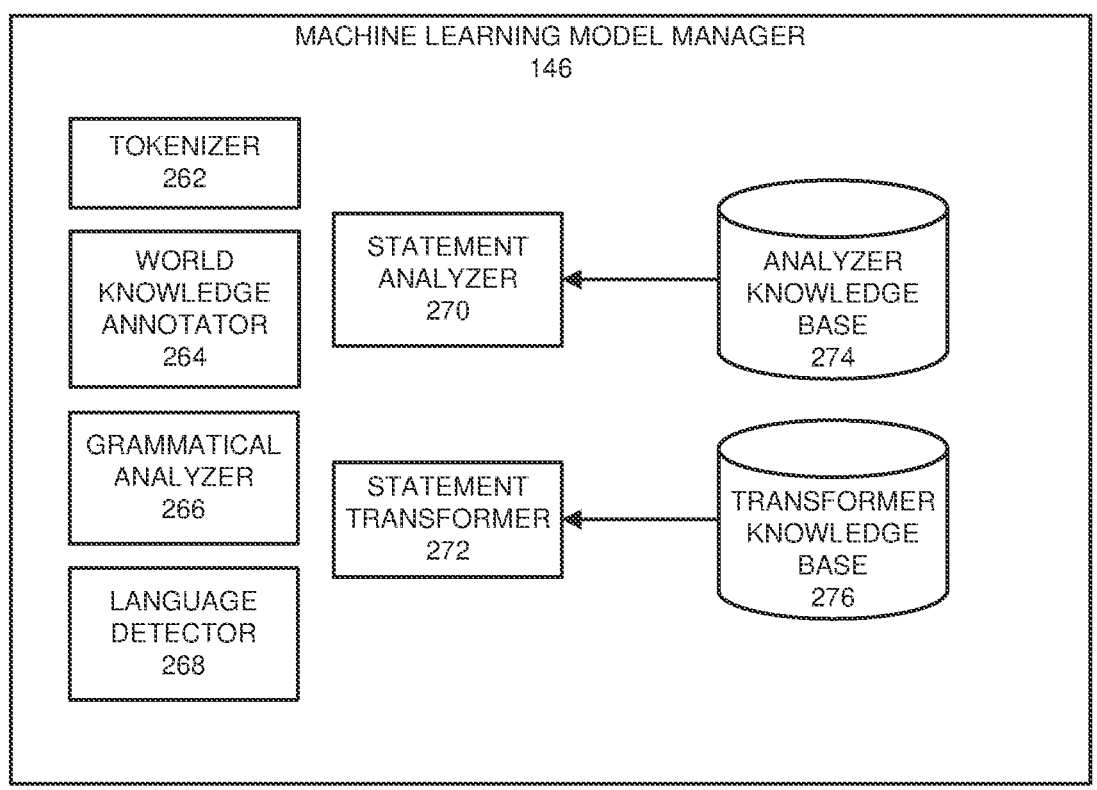
FIG. 2 illustrates an example of a machine learning model manager.

FIG. 2 illustrates the ML model manager 146 of FIG. 1. The ML model manager 146 includes a tokenizer 262, a world knowledge annotator 264, a grammatical analyzer 266, a language detector 268, a statement analyzer 270, a statement transformer 272, an analyzer knowledge base 274, and a transformer knowledge base 276. Although the ML model manager 146 can be configured to execute a plurality of transformations, for simplicity, the ML model manager 146 will be described relative to configuration for a single transformation of a source conversational training set from a first knowledge area to a second knowledge area. In a typical embodiment, the ML model manager 146 can iteratively operate on each statement of the conversational training set to execute the transformation for which it is configured.

The tokenizer 262 receives a statement as an input and tokenizes the statement by breaking it into a series of tokens. The world knowledge annotator 264 can take note of and annotate tokens or groups of tokens that refer to historical or fictional events, places, people, and/or the like. For example, in various cases, the annotations made by the world knowledge annotator 264 can indicate the historical or fictional event, place or person to which a given token or group of tokens refers. In addition, or alternatively, the world knowledge annotator 264 can annotate individual tokens or groups of tokens with knowledge representation indicators that include references to a meaning in a knowledge representation such as an ontology, onomasticon, and/or gazetteer.

The grammatical analyzer 266 analyzes the grammatical structure of the statement, utilizing tokens and a parts-of-speech annotator to identify nouns, verbs, prepositions, articles, as well as optionally constructing a parse tree of the statement In various embodiments, the grammatical analyzer 266 can annotate the series of tokens with various grammar-relevant and/or formatting features such as, for example, case-normalized versions of the tokens, parts-of-speech indicators, grammar identifiers, grammatical inconsistencies, other linguistic properties, a grammatical tree representation of some or all of the tokens, in whole or in part, combinations of the foregoing and/or the like. The language detector 268 determines the language of the statement using distinguishing elements and statistical similarities between the statement and pre-trained languages. In various embodiments, the language detector 268 can annotate individual tokens or groups of tokens with the determined language.

The statement analyzer 270 is operable to analyze the statement in accordance with the transformation for which it is configured. In a typical embodiment, the statement analyzer 270 is configured with a ML model that is trained to recognize patterns of language variation. The patterns of language variation typically signify tokens, groups of tokens, annotations, combinations of the foregoing, and/or the like that may differ between the first knowledge area and the second knowledge area. As further described below, the occurrence of such a pattern in the statement may cause a substitution to occur. In certain embodiments, the ML model of the statement analyzer 270 is informed by the analyzer knowledge base 274. The analyzer knowledge base 274 can specify, for example, the patterns of language variation described previously.

The statement transformer 272 is operable to transform the statement in accordance with the transformation for which it is configured. In a typical embodiment, the statement transformer 272 is configured with a ML model that is trained to identify substitute language for the patterns of language variation, if any, that have been identified by the statement analyzer 270. In certain embodiments, the ML model of the statement transformer 272 is informed by the transformer knowledge base 276. The transformer knowledge base 276 can specify, for example, substitute language or segments, or provide information usable to determine such substitute language or segments, based on the patterns of language variation described previously.

In operation, the ML model manager 146 can iteratively process each statement of the source conversational training set to yield the new conversational training set for the second knowledge area. For each statement, the tokenizer 262, the world knowledge annotator 264, the grammatical analyzer 266, and/or the language detector 268 collectively produce an annotated series of tokens, which tokens are received by the statement analyzer 270. The statement analyzer 270 searches for patterns of language variation between the first knowledge area and the second knowledge area. According to this functionality, the statement analyzer 270 can select segments of each statement as candidates for substitution. The selected segments can correspond to some or all of the patterns of language variation that have been located in the conversational training set. The selected segments can correspond to the entirety of the statement or any subset thereof. For each statement, the statement transformer 272 can then transform the statement into a new statement that includes one or more substitute segments that at least partially replace the segments that were previously selected by the statement analyzer 270 as the candidates for substitution. Operation of the ML model manager 146 will be described in further detail relative to FIGS. 3 and 4.

Figure 3:
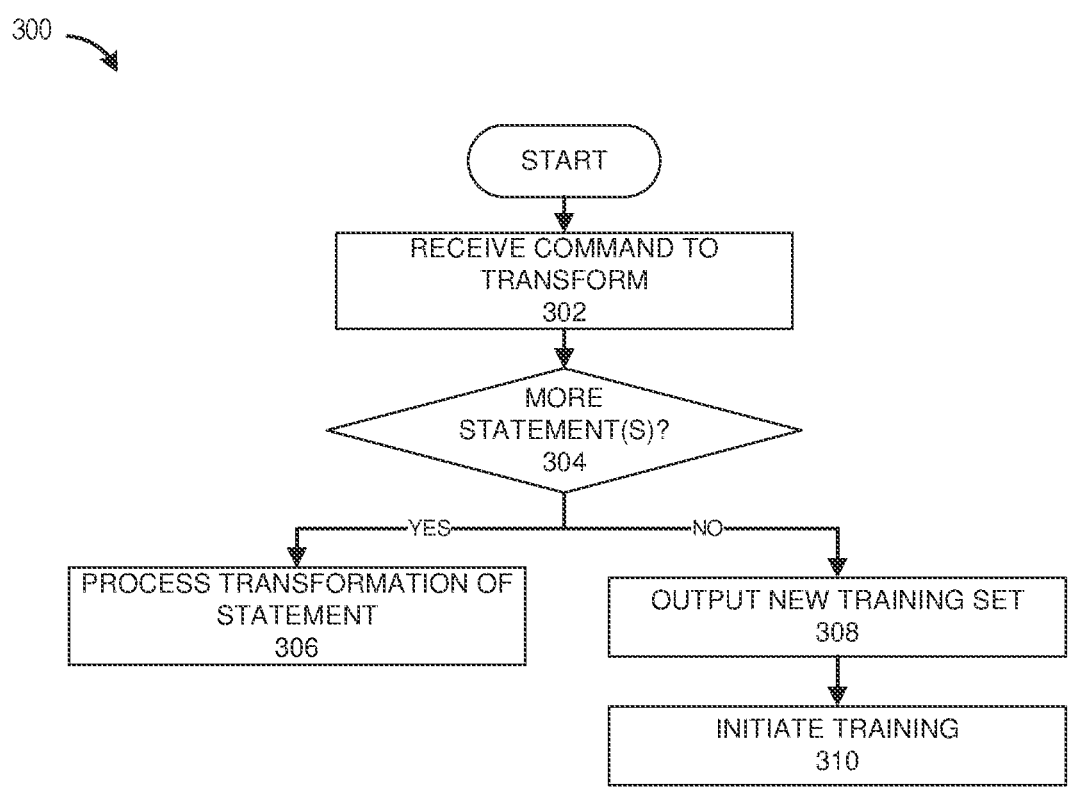
FIG. 3 illustrates an example of a process for transforming conversational training data.

FIG. 3 illustrates an example of a process 300 for transforming conversational training data. In certain embodiments, the process 300 can be implemented by any system that can process data. Although any number of systems, in whole or in part, can implement the process 300, to simplify discussion, the process 300 will be described in relation to particular components shown and described relative to FIG. 2.

At block 302, the ML model manager 146 receives a command to transform one or more statements of a source conversational training set, such as the entirety of the source conversational training set, into training data for a second training set. The command can be received, for example, from an administrator, super user, other user, or computer system. The command can indicate the transformation in any suitable fashion. For example, the command can provide, or indicate, information sufficient to identify the source conversational training set and/or statements thereof, a first knowledge area, and a second knowledge area, where the source conversational training set trains a first ML model in the first knowledge area. In certain embodiments, the transformation is characterized by an objective of generating a new conversational training set that is usable to train a second ML model in the second knowledge area.

At decision block 304, the ML model manager 146 determines whether the source conversational training set includes any statements for processing. In typical embodiment, the ML model manager 146 iterates through each statement of the source conversational training set and reaches a positive determination if there are any statements in the source conversational training set that have not been processed. Otherwise, if all statements have been processed, the ML model manager 146 reaches a negative determination.

If it is determined at the decision block 304 that the source conversational training set includes one or more additional statements for processing, the process 300 proceeds to block 306. At block 306, the ML model manager 146 processes transformation of a next statement in the source conversational training set. In certain embodiments, iterative processing of blocks 302-306 can progressively result in generation of the new conversational training set. For each statement, execution of the block 306 can result in the statement either being transformed or left unchanged.

Operation of the block 306 will be described in greater detail relative to FIG. 4. If it is determined at the decision block 304 that the source conversational training set does not include any additional statements for processing, the process 300 proceeds to block 308.

At block 308, the ML model manager 146 outputs the new conversational training set. In some embodiments, the new conversational set includes each statement that is transformed at the block 306 as well as each statement that is left unchanged. In other embodiments, the new conversational set can omit some or all of the statements that are left unchanged. At block 310, the ML model manager 146 initiates training of the second ML model using the new conversational training set. In some embodiments, the block 310 can be omitted. After block 310, the process 300 ends.

Figure 4:
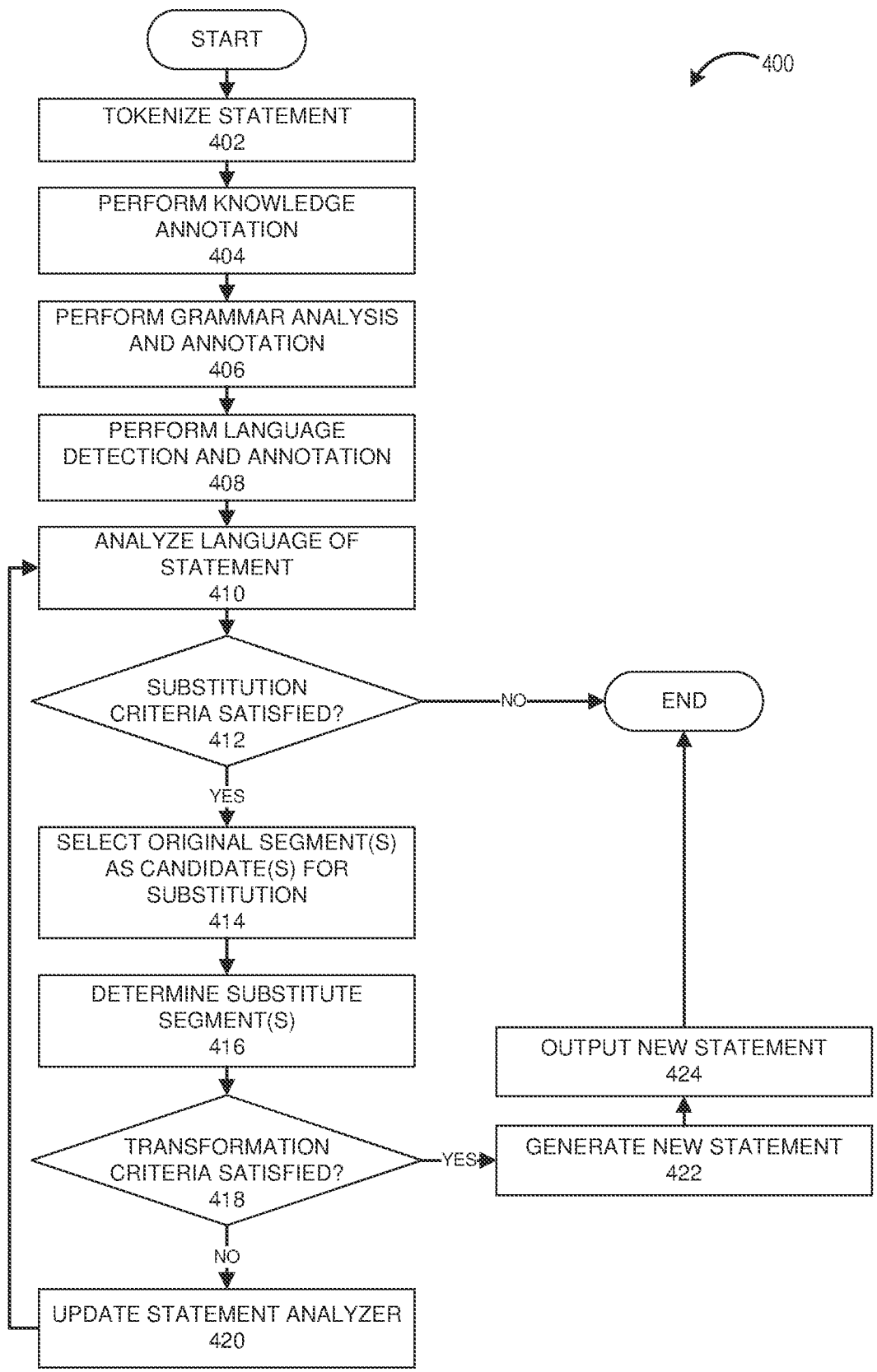
FIG. 4 illustrates an example of a process for transforming a statement.

FIG. 4 illustrates an example of a process 400 for transforming a statement. In certain embodiments, the process 400 can be performed as all or part of the block 306 of FIG. 3. In certain embodiments, the process 400 can be implemented by any system that can process data. Although any number of systems, in whole or in part, can implement the process 400, to simplify discussion, the process 400 will be described in relation to particular components shown and described relative to FIG. 2. For simplicity of description, the process 400 will be described in the context of block 306 of FIG. 3, although it should be appreciated that the process 400 can also be performed independently.

At block 402, the tokenizer 262 receives and tokenizes an original statement in the source conversational training set as described relative to FIG. 2, with the block 402 yielding a series of tokens representing the original statement. At block 404, the world knowledge annotator 264 performs knowledge annotation as described relative to FIG. 2. At block 406, the grammatical analyzer 266 performs grammar analysis and annotation as described relative to FIG. 2. At block 408, the language detector 268 performs language detection and annotation as described relative to FIG. 2. In general, blocks 402-408 can result in an annotated series of tokens for the original statement. In some embodiments, if the conversational training set already includes data similar to the data produced by the blocks 402-408, these blocks can be omitted. It should be appreciated that blocks 402-408 can also be omitted for efficiency or for other reasons.

At block 410, the statement analyzer 270 analyzes language of the original statement using the ML model with which it is configured. In various embodiments, the analysis at the block 410 can utilize the annotated series of tokens produced by the blocks 402-408. The block 410 can include, for example, searching the original statement for one or more patterns specified in the analyzer knowledge base 274, and locating each instance of one of the specified patterns. Each located instance of one of the specified patterns may be considered a match, with each match being measured by its similarity to the specified pattern.

At decision block 412, the statement analyzer 270 determines whether substitution criteria are satisfied for the original statement, such that there is a reason to continue with the process 400 relative to that statement. In an example, the decision block 412 can involve ascertaining whether a sufficiently prominent combination of patterns has been recognized by the statement analyzer 270. A prominent combination can be deemed to exist, for example, via criteria that specifies particular patterns, particular types of patterns, particular combinations of patterns and/or types of patterns, certain numbers of patterns, or the like. A prominent combination can also be deemed to exist at least partly based on a measured similarity of each match to its corresponding pattern. In another example, the decision block 412 can involve determining whether at least one match satisfies specified criteria for substitution. The substitution criteria can be specified, for example, in terms of measured similarity of each match to the pattern. The substitution criteria can, in some cases, be individualized for particular patterns or types of patterns.

If it is determined at the decision block 412, using any suitable method, that the substitution criteria are not satisfied, the process 400 ends with the original statement unchanged. Otherwise, if it is determined at the decision block 412 that the substitution criteria are satisfied, at block 414, the statement analyzer 270 selects one or more segments of the original statement as candidates for substitution. In various embodiments, the selection at the block 414 can involve selecting each segment corresponding to a pattern recognized by the statement analyzer 270. In some cases, the selection at the block 414 can involve only selecting those segments that satisfy a specified similarity threshold relative to the recognized patterns.

At block 416, the statement transformer 272 uses its trained ML model to determine one or more substitute segments for some or all of the segments that were selected as candidates for substitution. As described relative to FIG. 2, the new segments can be informed, at least in part, by the transformer knowledge base 276. At decision block 418, the statement transformer 272 determines whether transformation criteria are satisfied for the original statement, such that there is a transformation that will be performed. The transformation criteria can be established and evaluated in any suitable fashion.

For example, it should be appreciated that the substitute segments that are determined can, in some cases, include segments that conflict with each other because, for example, they represent mutually exclusive alternatives for the same substitution. The statement transformer 272 can evaluate each substitute segment's measured similarity to the original segment that it would replace and/or to that original segment's recognized pattern. Thereafter, the statement transformer 272 can enumerate each set of substitutions that can be performed without conflict, with each set including one or more substitutions, and produce a substitution score for the set. The substitution score can be, for example, a statistical measure of the measured similarities in the set (e.g., mean, median, mode). In various embodiments, if the substitution score fails to satisfy a configurable threshold, the statement transformer 272 can determine that the transformation criteria is not satisfied.

If it is determined at the decision block 418 that the transformation criteria are not satisfied, the process 400 proceeds to block 420. At block 420, the original statement is left unchanged and the configuration of the statement analyzer 270 is modified such that it does not pass a future instance of the same pattern (or a configurably similar pattern) to the statement transformer 272 for processing of a transformation, thereby reducing future computational load. From block 420, the process 400 returns to the block 410 and operates as described previously, except that the process 400 will end following the decision block 412 due to the configuration update.

If it is determined at the decision block 418 that the transformation criteria are satisfied, the process 400 proceeds to block 422. At block 422, the statement transformer 272 generates a new statement that includes one or more of the substitute segments, such that the one or more of the substitute segments at least partially replace one or more of the original segments that were selected at the block 414. In various embodiments, the statement transformer 272 can generate the new statement using one, two, three or any other suitable number of the substitute segments. For example, the statement transformer 272 can use each substitute segment having a similarity score in excess of a threshold, prioritizing higher scores in case of conflict. Other examples will be apparent to one skilled in the art after a detailed review of the present disclosure. At block 424, the statement transformer 272 outputs the new statement. After block 424, the process 400 ends.

Figure 5:
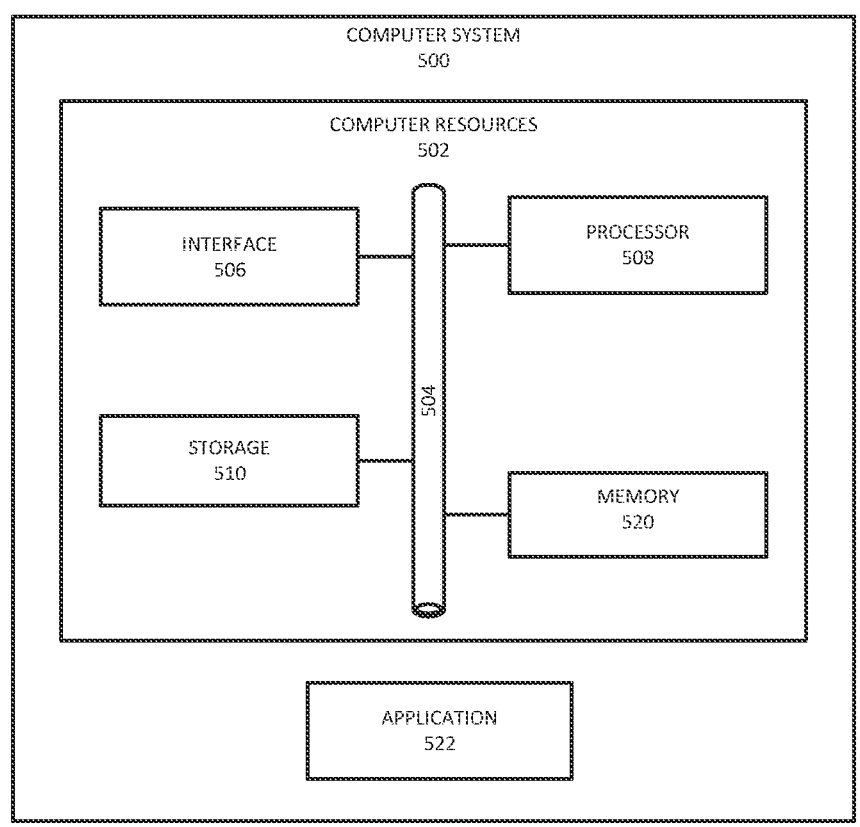
FIG. 5 illustrates an example of a computer system.

FIG. 5 illustrates an example of a computer system 500 that, in some cases, can be representative, for example, of the tenant systems 110, the dialogue processing system 130, the interactive systems 122, the user systems 160 and/or a module or sub-component of the foregoing. The computer system 500 includes an application 522 operable to execute on computer resources 502. The application 522 can be, for example, any of the systems or modules illustrated in FIG. 1 or FIG. 2. In particular embodiments, the computer system 500 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 500 may comprise any suitable physical form, configuration, number, type and/or layout. As an example, and not by way of limitation, the computer system 500 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 500 may include one or more computer systems; be unitary or distributed; span multiple locations; span multiple machines; or reside in a cloud, which may include one or more cloud components in one or more networks.

In the depicted embodiment, the computer system 500 includes a processor 508, memory 520, storage 510, interface 506, and bus 504. Although a particular computer system is depicted having a particular number of particular components in a particular arrangement, this disclosure contemplates any suitable computer system having any suitable number of any suitable components in any suitable arrangement.

Processor 508 may be a microprocessor, controller, or any other suitable computing device, resource, or combination of hardware, software and/or encoded logic operable to execute, either alone or in conjunction with other components, (e.g., memory 520), the application 522. Such functionality may include providing various features discussed herein. In particular embodiments, processor 508 may include hardware for executing instructions, such as those making up the application 522. As an example, and not by way of limitation, to execute instructions, processor 508 may retrieve (or fetch) instructions from an internal register, an internal cache, memory 520, or storage 510; decode and execute them; and then write one or more results to an internal register, an internal cache, memory 520, or storage 510.

In particular embodiments, processor 508 may include one or more internal caches for data, instructions, or addresses. This disclosure contemplates processor 508 including any suitable number of any suitable internal caches, where appropriate. As an example, and not by way of limitation, processor 508 may include one or more instruction caches, one or more data caches, and one or more translation lookaside buffers (TLBs). Instructions in the instruction caches may be copies of instructions in memory 520 or storage 510 and the instruction caches may speed up retrieval of those instructions by processor 508. Data in the data caches may be copies of data in memory 520 or storage 510 for instructions executing at processor 508 to operate on; the results of previous instructions executed at processor 508 for access by subsequent instructions executing at processor 508, or for writing to memory 520, or storage 510; or other suitable data. The data caches may speed up read or write operations by processor 508. The TLBs may speed up virtual-address translations for processor 508. In particular embodiments, processor 508 may include one or more internal registers for data, instructions, or addresses. Depending on the embodiment, processor 508 may include any suitable number of any suitable internal registers, where appropriate. Where appropriate, processor 508 may include one or more arithmetic logic units (ALUs); be a multi-core processor, include one or more processors 508; or any other suitable processor.

Memory 520 may be any form of volatile or non-volatile memory including, without limitation, magnetic media, optical media, random access memory (RAM), read-only memory (ROM), flash memory, removable media, or any other suitable local or remote memory component or components. In particular embodiments, memory 520 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 520 may include one or more memories 520, where appropriate. Memory 520 may store any suitable data or information utilized by the computer system 500, including software embedded in a computer readable medium, and/or encoded logic incorporated in hardware or otherwise stored (e.g., firmware). In particular embodiments, memory 520 may include main memory for storing instructions for processor 508 to execute or data for processor 508 to operate on. In particular embodiments, one or more memory management units (MMUs) may reside between processor 508 and memory 520 and facilitate accesses to memory 520 requested by processor 508.

As an example, and not by way of limitation, the computer system 500 may load instructions from storage 510 or another source (such as, for example, another computer system) to memory 520. Processor 508 may then load the instructions from memory 520 to an internal register or internal cache. To execute the instructions, processor 508 may retrieve the instructions from the internal register or internal cache and decode them. During or after execution of the instructions, processor 508 may write one or more results (which may be intermediate or final results) to the internal register or internal cache. Processor 508 may then write one or more of those results to memory 520. In particular embodiments, processor 508 may execute only instructions in one or more internal registers or internal caches or in memory 520 (as opposed to storage 510 or elsewhere) and may operate only on data in one or more internal registers or internal caches or in memory 520 (as opposed to storage 510 or elsewhere).

In particular embodiments, storage 510 may include mass storage for data or instructions. As an example, and not by way of limitation, storage 510 may include a hard disk drive (HDD), a floppy disk drive, flash memory, an optical disc, a magneto-optical disc, magnetic tape, or a Universal Serial Bus (USB) drive or a combination of two or more of these. Storage 510 may include removable or non-removable (or fixed) media, where appropriate. Storage 510 may be internal or external to the computer system 500, where appropriate. In particular embodiments, storage 510 may be non-volatile, solid-state memory. In particular embodiments, storage 510 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these Storage 510 may take any suitable physical form and may comprise any suitable number or type of storage. Storage 510 may include one or more storage control units facilitating communication between processor 508 and storage 510, where appropriate.

In particular embodiments, interface 506 may include hardware, encoded software, or both providing one or more interfaces for communication (such as, for example, packet-based communication) among any networks, any network devices, and/or any other computer systems. As an example, and not by way of limitation, communication interface 506 may include a network interface controller (NIC) or network adapter for communicating with an Ethernet or other wire-based network and/or a wireless NIC (WNIC) or wireless adapter for communicating with a wireless network.

Depending on the embodiment, interface 506 may be any type of interface suitable for any type of network for which computer system 500 is used. As an example, and not by way of limitation, computer system 500 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 500 may include any suitable interface 506 for any one or more of these networks, where appropriate.

In some embodiments, interface 506 may include one or more interfaces for one or more I/O devices. One or more of these I/O devices may enable communication between a person and the computer system 500. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 506 for them. Where appropriate, interface 506 may include one or more drivers enabling processor 508 to drive one or more of these I/O devices. Interface 506 may include one or more interfaces 506, where appropriate.

Bus 504 may include any combination of hardware, software embedded in a computer readable medium, and/or encoded logic incorporated in hardware or otherwise stored (e.g., firmware) to couple components of the computer system 500 to each other. As an example, and not by way of limitation, bus 504 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 504 may include any number, type, and/or configuration of buses 504, where appropriate. In particular embodiments, one or more buses 504 (which may each include an address bus and a data bus) may couple processor 508 to memory 520. Bus 504 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 508 (such as, for example, one or more internal registers or caches), one or more portions of memory 520, one or more portions of storage 510, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments, are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of transforming conversational training data, the method comprising, by a computer system:
   receiving a command to transform a first statement in a first conversational training set into training data for a second conversational training set, wherein the first conversational training set trains a first machine learning model in a first knowledge area, and wherein the second conversational training set trains a second machine learning model in a second knowledge area;
   analyzing language of the first statement using a third machine learning model, wherein the third machine learning model is trained to recognize patterns of language variation between the first and second knowledge areas;
   responsive to the analyzing, selecting an original segment of the first statement as a candidate for substitution; and
   responsive to the selecting, transforming the first statement into a second statement for the second conversational training set, the second statement comprising a substitute segment that at least partially replaces the original segment.

2. The method of claim 1, wherein the analyzing comprises:
   searching the first statement for one or more patterns; and
   locating an instance of at least one pattern of the one or more patterns in the first statement.

3. The method of claim 2, wherein the selecting comprises selecting a segment of the first statement that corresponds to the located instance of the at least one pattern.

4. The method of claim 2, comprising:
   determining whether the located instance of the at least one pattern satisfies criteria for substitution based, at least in part, on a result of the analyzing; and
   wherein the selecting is performed responsive to a determination that the located instance of the at least one pattern satisfies the criteria for substitution, the selecting comprising selecting the located instance as the candidate for substitution.

5. The method of claim 4, wherein the determining whether the located instance of the at least one pattern satisfies criteria for substitution comprises determining whether a sufficiently prominent combination of patterns has been recognized in the first statement.

6. The method of claim 4, comprising, responsive to a determination that the located instance of the at least one pattern does not satisfy the criteria for substitution, leaving the first statement unchanged.

7. The method of claim 2, wherein the one or more patterns are specified, at least on part, in a knowledge base associated with the third machine learning model.

8. The method of claim 2, wherein the transforming comprises determining the substitute segment via a fourth machine learning model that is trained to identify substitute segments for transformations from the first knowledge area to the second knowledge area.

9. The method of claim 8, comprising:
   determining whether the substitute segment satisfies transformation criteria; and
   responsive to a determination that the transformation criteria are satisfied, generating the second statement.

10. The method of claim 9, comprising, responsive to a determination that the transformation criteria are not satisfied, updating a configuration such that a future instance of the at least one pattern is not processed for transformation.

11. The method of claim 9, wherein the transformation criteria are specified, at least in part, in terms of a measured similarity of the substitute segment to the located instance of the at least one pattern.

12. The method of claim 9, wherein the transformation criteria are specified, at least in part, in terms of a measured similarity of the substitute segment to the at least one pattern.

13. The method of claim 1, wherein the second knowledge area is a specialization of the first knowledge area.

14. The method of claim 1, wherein the second knowledge area is a generalization of the first knowledge area.

15. The method of claim 1, wherein the original segment and the substitute segment each comprise a plurality of tokens.

16. The method of claim 1, comprising outputting the second statement.

17. A method of transforming conversational training data, the method comprising, by a computer system:
- receiving a command to transform a first conversational training set into a second conversational training set, wherein the first conversational training set trains a first machine learning model in a first knowledge area, and wherein the second conversational training set trains a second machine learning model in a second knowledge area;
- for each statement of a plurality of statements in the first conversational training set:
  - analyzing language of the statement using a third machine learning model, wherein the third machine learning model is trained to recognize patterns of language variation between the first and second knowledge areas;
  - responsive to the analyzing, selecting an original segment of the statement as a candidate for substitution; and
  - responsive to the selecting, transforming the statement into a second statement for the second conversational training set, the second statement comprising a substitute segment that at least partially replaces the original segment; and
- outputting the second conversational training set.

18. The method of claim 17, comprising, for at least one statement of the first conversational training set, leaving the at least one statement unchanged, the second conversational training set comprising the unchanged at least one statement.

19. The method of claim 17, comprising initiating training of the second machine learning model using the second conversational training set.

20. A computer system comprising a processor and memory, wherein the processor and the memory in combination are operable to implement a method comprising:
- receiving a command to transform a first statement in a first conversational training set into training data for a second conversational training set, wherein the first conversational training set trains a first machine learning model in a first knowledge area, and wherein the second conversational training set trains a second machine learning model in a second knowledge area;
- analyzing language of the first statement using a third machine learning model, wherein the third machine learning model is trained to recognize patterns of language variation between the first and second knowledge areas;
- responsive to the analyzing, selecting an original segment of the first statement as a candidate for substitution; and
- responsive to the selecting, transforming the first statement into a second statement for the second conversational training set, the second statement comprising a substitute segment that at least partially replaces the original segment.

* * * * *